United States Patent [19]

Okada et al.

[11] Patent Number: 4,939,533
[45] Date of Patent: Jul. 3, 1990

[54] AUTO-FOCUSING DEVICE STORING PREDETERMINED CALIBRATION INFORMATION

[75] Inventors: Masaki Okada, Kawasaki; Ryosuke Miyamoto, Yokohama, both of Japan

[73] Assignee: Canon Kabushiki Kaisha, Tokyo, Japan

[21] Appl. No.: 254,801

[22] Filed: Oct. 7, 1988

[30] Foreign Application Priority Data

Oct. 15, 1987 [JP] Japan .................... 62-260853

[51] Int. Cl.$^5$ .............................. G03B 3/00
[52] U.S. Cl. ...................... 354/402; 354/403
[58] Field of Search ............ 354/400, 402, 403, 406, 354/407, 408

[56] References Cited

U.S. PATENT DOCUMENTS

| | | | |
|---|---|---|---|
| 4,251,144 | 2/1981 | Matsuda et al. | 354/403 |
| 4,274,735 | 6/1981 | Tamura et al. | 354/403 |
| 4,288,152 | 6/1981 | Matsuda | 354/403 |
| 4,311,904 | 1/1982 | Okada et al. | 354/25 |
| 4,367,934 | 1/1983 | Matsui | 354/403 |
| 4,441,810 | 4/1984 | Momose et al. | 354/403 |
| 4,522,492 | 6/1985 | Masunaga | 354/403 |
| 4,639,110 | 1/1987 | Rinn et al. | 354/403 |
| 4,783,676 | 11/1988 | Aihara et al. | 354/400 |

*Primary Examiner*—Russell E. Adams
*Attorney, Agent, or Firm*—Fitzpatrick, Cella, Harper & Scinto

[57] ABSTRACT

An auto-focusing device having a photosensor unit for receiving luminous flux from an object. Lens drive data is predetermined and stored in a storage circuit. The stored lens drive data is selected in accordance with an output from said photosensor unit, and the lens is driven according to the selected data. Each lens drive data stored in the storage circuit is associated with a respective one of a plurality of outputs from the photosensor unit at a time when an object is disposed at a predetermined distance and when luminous flux from the object is actually received by the photosensor unit.

8 Claims, 5 Drawing Sheets

| d | LIGHT-RECEIVING POSITION | DRIVE AMOUNT | $E^2$PROM ADDRESS | DISTANCE-MEASURING CIRCUIT OUTPUT |
|---|---|---|---|---|
| 1.5 | a | $X_1$ | $A_1$ | a' |
| 2 | b | $X_2$ | $A_2$ | b' |
| 3 | c | $X_3$ | $A_3$ | c' |
| 6 | d | $X_4$ | $A_4$ | d' |
| ⋮ | ⋮ | ⋮ | ⋮ | ⋮ |

AUTO-FOCUSING DEVICE STORING PREDETERMINED CALIBRATION INFORMATION

BACKGROUND OF THE INVENTION

1. Field of the Invention

This invention relates to an auto-focusing device for a camera.

2. Description of the Prior Art

Heretofore, various kinds of auto-focusing devices have been proposed wherein reference light is irradiated on an object via a flood optical system. Reflected light from said object is received on a fixed photosensor such as a PSD (position sensitive detector) via a light-receiving lens. The light-receiving position of said reflected light on said photosensor is detected from an output of the photosensor to determine the distance from the object. Adjustment of the focus is performed by driving the lens from the initial position thereof by a length in accordance with the determined distance.

In devices as described above, the amount of movement of the lens from its initial position can be uniquely determined in accordance with the light-receiving position of the reflected light on the surface of said photosensor. Hence, lens drive control has been performed by storing in a storage device a standard, general relationship between the light-receiving position of the reflected light on the surface of said photosensor and the drive amount of the lens and by detecting, when performing the auto-focusing operation, the light-receiving position of the reflected light on said photosensor, and by reading a drive amount in accordance with said light-receiving position from the storage device.

Since the relationship between the light-receiving position and the drive amount of the lens can be basically determined in a unique fashion, the information on each lens drive amount to be stored in said storage device with regard to each light-receiving position can be fixed at a constant value.

Actually, however, it is necessary to calibrate a relationship between the light-receiving position and the lens drive amount, due to variations from the proper photosensor fixing position while mounting said photosensor in the camera and or variations in the accuracy of the output from each photosensor. Heretofore, the relationship between the light-receiving position and the lens drive amount must be calibrated by finely adjusting the fixing position of the photosensor.

In the conventional method in which calibration is performed by finely adjusting the position of the photosensor as described above, the mechanism for the position adjustment of the photosensor becomes necessarily complicated in order to perform the calibration with a high accuracy, resulting in a larger camera configuration and/or a complication of camera handling.

SUMMARY OF THE INVENTION

The present invention provides an auto-focusing device wherein each device is separately calibrated to predetermine the actual light-receiving position on the photosensor corresponding to a specific predetermined distance from the camera to the object. The information about the lens drive amount corresponding to the predetermined distance, in the form of a predetermined relationship with said light-receiving position, is stored on a storage device beforehand. The information about the lens drive amount with regard to the light-receiving position corresponding to the distance stored in the storage device is read in accordance with the actual light-receiving position on the photosensor during photographing. Thus accurate auto-focusing is always possible even when variations exist in the disposition of the photosensor in the camera.

In one aspect of the invention, an auto-focusing device having a photosensor unit which receives luminous flux from an object and generates an output in accordance with the distance from the object includes storage means, selection means, and lens drive means. The storage means stores predermined data regarding lens drive amounts corresponding to the output from the photosensor unit. The selection means selects lens drive amount data stored in the storage means in accordance with the output from the photosensor unit. The lens drive means drives the lens according to the lens drive amount selected by the selection means. The lens drive amount data stored in the storage means is predetermined for a plurality of lens drive amounts corresponding to respective predetermined distances from the lens to the object. Each stored lens drive amount is associated with a respective output from the photosensor unit at a time when the object is disposed at a predetermined distance from the lens and when luminous flux from the object is actually received from the photosensor unit.

In a further aspect of the invention, an auto-focusing device having a photosensor unit which receives luminous flux from an object and generates an output in accordance with the distance from the object includes storage means, selection means, and lens drive means. The storage means includes a plurality of storage units, each storage unit storing distance data corresponding to a predetermined distance from the object to the photosensor unit. Each stored distance data is associated with a respect of one of a plurality of outputs from the photosensor unit at a time when the object is disposed at a predetermined distance from the photosensor unit and when luminous flux from the object is actually received by the photosensor unit. The selection means selects a storage unit corresponding to the output from the photosensor unit. The lens drive means drives the lens according to the distance data stored in the storage unit selected by the selection circuit.

In yet a further aspect of the present invention, an auto-focusing device having a photosensor unit which receives luminous flux from an object and generates an output in accordance with the distance from the object includes storage means, selection means, and lens drive means. The storage means stores distance data corresponding to predetermined distances from the object to said photosensor unit. Each one of a plurality of distance data is associated with a respective one of a plurality of outputs from the photosensor unit at a time when the object is disposed at a predetermined distance from the photosensor unit, and when luminous flux from said object is actually received by the photosensor units. The selection means selects one of the stored distance data in accordance with the output from the photosensor unit. The lens drive means drives the lens according to the distance data selected by the selection means.

Other objects of the present invention will become more apparent from the following description with reference to the drawings.

DETAILED DESCRIPTION OF THE PREFERRED EMBODIMENT

Figure 1:
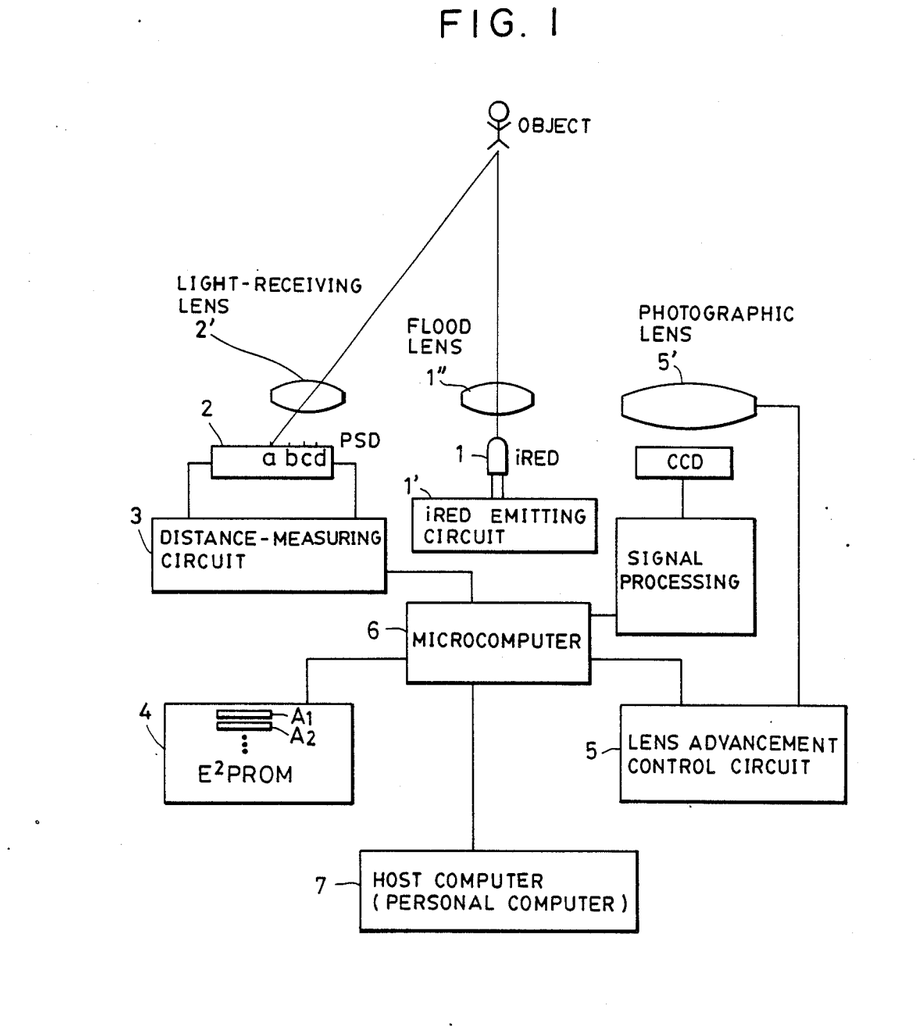
FIG. 1 is a block diagram illustrating an embodiment of an auto-focusing device according to the present invention.

FIG. 1 is a block diagram illustrating an embodiment of an auto-focusing device according to the present invention.

In the figure, there are shown in iRED (infra-red emitting diode) 1 for projecting reference light, an iRED emission control circuit 1' for controlling the iRED emission, and a flood lens 1" for projecting luminous flux from th iRED on an object. The reference light from said iRED 1 is projected on the object via the flood lens 1". There is also shown a light-receiving lens 2' which receives the light reflected from the object and guides the light onto a PSD as the photosensor 2. A positional relationship between said light-receiving lens 2' and photosensor 2 is arranged so that a light-receiving position of said reflected light on the photosensor is at a predetermined position with regard to a distance from the object. The photosensor 2 generates an output in accordance with the light-receiving position thereof and transmits said output to a distance-measuring circuit 3. The distance-measuring circuit 3 is an arithmetic circuit which determines the distance from the object based on the output of the photosensor 2. Measuring circuit 3 then outputs information regarding the distance from the object. E$^2$PROM (electrically erasable programmable read only memory) 4 functions as a storage device for storing the information regarding the lens drive amount in accordance with the distance information which corresponds to the detected light-receiving position. A microcomputer 6 operates the iRED emission control circuit 1' during photographing, makes iRED 1 project light, and further makes the distacne-measuring circuit 3 determine the distance to the object when the photosensor 2 receives reflected light from the object. At the same time, microcomputer 6 incorporates a program for reading from E$^2$PROM 4 the information regarding the lens drive amount in accordance with the distance information supplied by distance measuring circuit 3. Microcomputer 6 then transmits said information regarding the lens drive amount to a lens advancement control circuit 5, when drives a photographic lens 5' by a distance corresponding to said information regarding the lens drive amount being read in order to perform focusing. The lens advancement control circuit 5 drives the lens 5' through a driving motor (not shown). A well-known circuit is used as the lens advancement control circuit 5.

Each device described above is disposed within the camera. By an instruction from a host computer 7 (for example, a personal computer) which is capable of being connected to the microcomputer 6 within the camera, the above-described lens drive amount operation is performed in the microcomputer 6, and the information regarding the lens drive amount corresponding to the information regarding the light-receiving position at a particular moment is written into the E$^2$PROM 4.

The writing of the information regarding the lens drive amount into said E$^2$PROM using said host computer 7 is performed beforehand, for example in a manufacturing factory.

Now, the operation of the FIG. 1 embodiment will be explained.

First, the writing of the information regarding the lens drive amount into the E$^2$PROM 4 will be explained.

A reflecting board with a predetermined reflectivity (for example, 32%) is disposed at a predetermined distance (for example, 1.5m) from the camera. Under this condition, a lens drive amount (for example, $X_1$) corresponding to the predetermined distance is set in the host computer 7. The information regarding said lens drive amount represents the amount of advancement of the lens 51 from an initial position thereof which is necessary for focusing the object when the object is situated at the preassigned position. This information can be uniquely determined as a specific value with regard to the predetermined distance when the characteristics of the photographic lens system are known. Under this condition, the host computer 7 operates to make the microcomputer 6 execute the program shown in FIG. 2.

Figure 2:
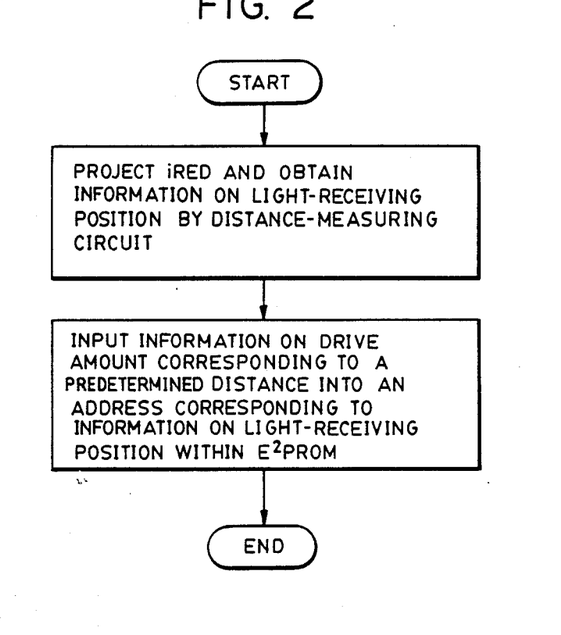
FIGS. 2 and 3 are flow charts illustrating programs for executing writing of calibrating information into a storage device according to the present invention.

The microcomputer 6 projects the luminous flux of the iRED 1 onto the reflecting board by an insturction from the host computer 7, and the reflected light therefrom is projected on the photosensor 2 via the light-receiving lens 2'. The photosensor 2 generates an output in accordance with the light-receiving position of said reflected light, and the information regarding the camera to object distance at that moment, that is, the distance information corresponding to the detected light-receiving position, is determined by the distance-measuring circuit 3.

Suppose the light-receiving position at this moment is a on the photosensor in FIG. 1. Then the information a' corresponding to this position a is obtained (FIG. 4), and the lens drive amount $X_1$ corresponding to said predetermined distance is written in an address $A_1$ of the storage unit within the E$^2$PROM 4 corresponding to said information a'. By the foregoing operation, the writing into E$^2$PROM 4 of the relationship between the light-receiving position a and the lens drive amount $X_1$ with regard to the predetermined camera to object distance 1.5 m is completed. Then, the reflecting board is set at another predetermined position (for example, 2 m), the information regarding the lens drive amount corresponding to said predetermined distance is set into the host computer, and the program shown in FIG. 2 is executeed again. When the light-receiving position on the photosensor 2 at this moment is b in FIG. 1, the information b' corresponding to the light-receiving position b is determined by the distance-measuring circuit 3, and the lens drive amount $X_2$ corresponding to the predetermined distance is written in an address unit $A_2$ within the E$^2$PROM 4 corresponding to said information b'.

Figure 3:
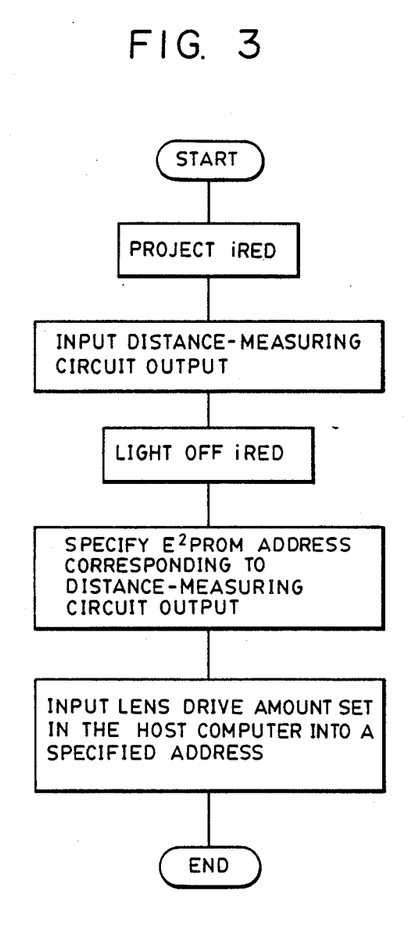

By further repeating the above-described operation while changing the predetermined distance, information regarding the lens drive amount corresponding to the light-receiving position for each predetermined distance can be written into the E$^2$PROM 4. The details of the FIG. 2 shown in FIG. 3: the operation of the FIG. 2 process is executed according to the flow shown in FIG. 3.

Now, the photographing operation using a camera storing such predetermined information will be explained.

Figure 4:
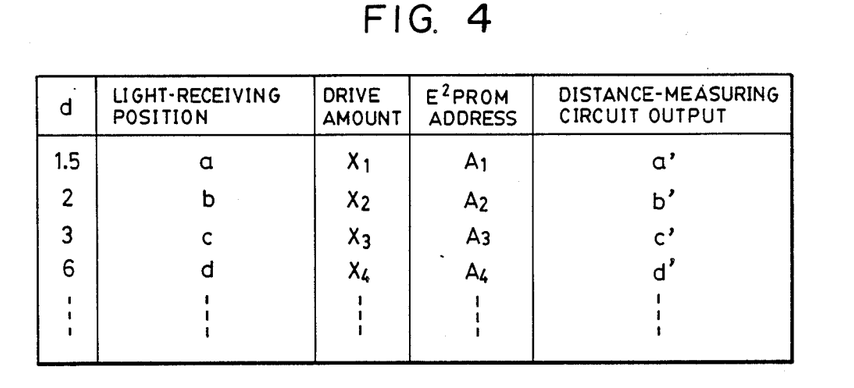
FIG. 4 is an explanatory diagram showing the relationship among the predetermined distances, the light-receiving positions and the drive amounts according to the present invention.

Suppose that the information regarding the lens drive amount $X_1-X_4$ as shown in FIG. 4 is stored in E²PROM 4.

Figure 5:
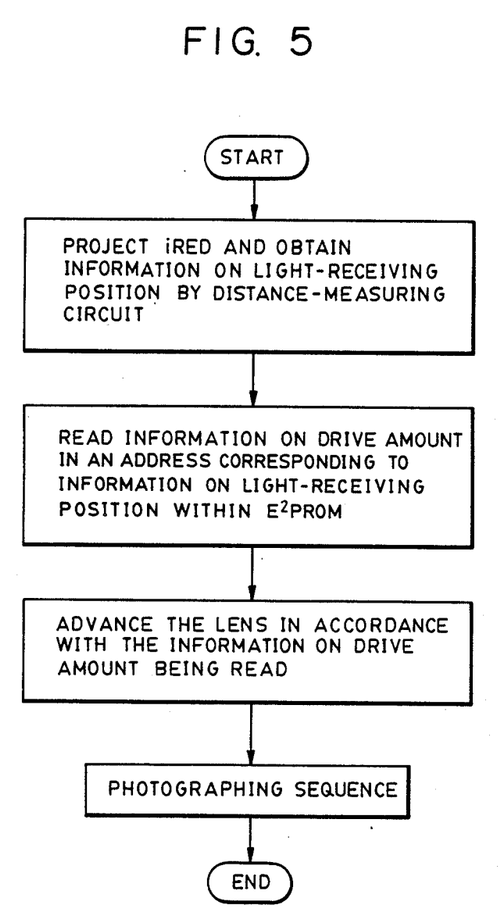
FIGS. 5 and 6 are flow charts illustrating programs for executing photographing operations according to the present invention.
Figure 6:
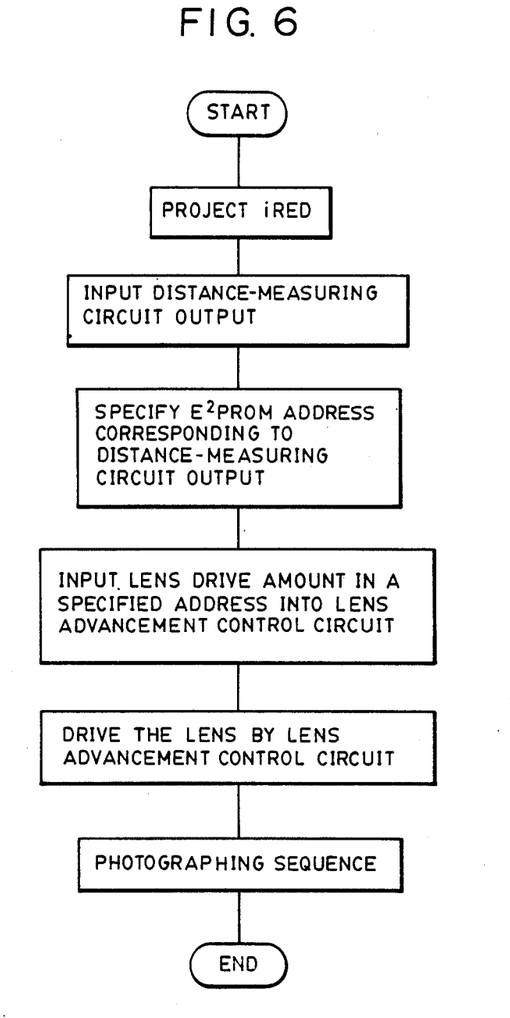

When the camera shutter is released, the program shown in FIG. 5 is executed by the microcomputer 6. Information regarding the camera to object distance can be determined by the distance-measuring circuit 3. Now, suppose that the object is at a distance of 2 m, then the light-receiving position is b, and the information b' corresponding to this position b can be determined, and the lens drive information $X_2$ stored at adderess $A_2$ within the E² PROM 4 is read. Said information $X_2$ is transmitted to the lens advancement control circuit 5, the lens 5' is moved by a distance corresponding to said information $X_2$, and thus the focusing operation is completed. The explanation of the rest of the photographing operation will be omitted since it has no direct relationship with the present invention. The details of the process of FIG. 5 are illustrated in FIG. 6. Actually the process of FIG. 5 is executed according to the flow in FIG. 6.

As described above, in the present invention the information regarding the lens drive amount corresponds to the photosensor light-receiving position (photosensor output), and is stored in the storage device. Hence, it becomes possible to always maintain a proper relationship between the distance from the object, the photosensor output and the lens drive amount, without performing mechanical calibration of the photosensors even when variations exist in the positions of the photosensors.

In the described embodiment, the information regarding the lens drive amount corresponding to each predetermined distance is directly written in the E²PROM. However, the information regarding the lens drive amount necessary for focusing at the predetermined distance may be determined by the microcomputer, and this information may be written in the E²PROM as the information corresponding to the light-receiving position at that moment.

Further, a formula for obtaining the lens drive amount corresponding to the detected light-receiving position may be written in the E²PROM. The formula for determining the lens drive amount may be read by the microcomputer during photographing, and the lens drive amount may be calculated, and thus the lens may be driven and controlled.

Further, a program for calculating a correlation between the light-receiving position obtained during photography and the light-receiving position written in the E²PROM may be incorporated in the microcomputer. Thus, the lens drive amount written in the E²PROM may be read along with the corresponding correlation information to perform the lens drive operation. It will be also noted that the photosensor 2 may comprise a line sensor such as a CCD instead of the PSD.

As described above, in an auto-focusing device according to the present invention, a relationship between the actual light-receiving position on the photosensor and the lens drive amount is written in a storage device such as E²PROM, so that accurate focusing can be performed even when the photosensor is disposed at a position other than the proper position.

The specific structural details of the devices represented by blocks in the schematic diagram of FIG. 1 are per se well known or could be readily constructed by the person of ordinary skill in this field without undue experimentation. Therefore, the exact structure of the blocks in the schematic is not described in further detail in order to more clearly describe the present invention, and since such details are not critical to the best mode of carrying out the present invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadset interpretation so as to encompass all such modifications and equivalent structures and functions.

What is claimed is:

1. An auto-focusing device having a photosensor unit for receiving luminous flux from an object and generating an output in accordance with a distance from the object, comprising:
   (a) storage means for storing predetermined data regarding lens drive amounts corresponding to the output from said photosensor unit;
   (b) selection means for selecting lens drive amount data stored in said storage means in accordance with the output from said photosensor unit; and
   (c) lens drive means for driving a lens according to the lens drive amount data selected by said selection means;
   wherein a correspondence between the data selected by said selection means and the output from the photosensor unit is predetermined in a calibration operation when the object is disposed at a predetermined distance from the lens and when luminous flux from the object is actually received by said photosensor unit.

2. An auto-focusing device according to claim 1 wherein said selection means includes means for selecting one of the lens drive amounts in accordance with an output from said photosensor unit.

3. An auto-focusing device having a photosensor unit for receiving luminous flux from an object and generating an output in accordance with a distance from the object, comprising:
   (a) storage means including a plurality of storage units, each storage unit storing distance data corresponding to a predetermined distance from the object to said photosensor unit;
   (b) selection means for selecting a storage unit corresponding to the output from said photosensor unit; and
   (c) lens drive means for driving a lens according to distance data stored in one of said storage units selected by said selection circuit,
   wherein a correspondence between the data stored in the storage unit selected by said selection means and the output from the photosensor unit is predetermined by calibrating the output from the photosensor unit, the calibration being carried out when the object is disposed at a predetermined distance from the lens and when luminous flux from the object is actually received by the photosensor unit.

4. An auto-focusing device according to claim 3 said photosensor comprises a PSD.

5. An auto-focusing device according to claim 3 further including a CCD photosensor unit.

6. An auto-focusing device according to claim 1 further including a PSD photosensor unit.

7. An auto-focusing device according to claim 1 further including a CCD photosensor unit.

8. An auto-focusing device having a photosensor unit for receiving luminous flux from an object and generating an output in accordance with a distance from the object, comprising:

(a) storage means for storing a plurality of distance data corresponding to predetermined distances from the object to said photosensor unit;

(b) selection means for selecting one of the stored distance data in accordance with the output from said photosensor unit; and (c) lens drive means for driving a lens according to the distance data selected by said selection means, wherein a correspondence between the data selected by said selection means and the output from the photosensor unit is predetermined in a calibration operation when the object is disposed at a predetermined distance from the lens and when luminous flux from the object is actually received by the photosensor unit.

* * * * *

UNITED STATES PATENT AND TRADEMARK OFFICE
CERTIFICATE OF CORRECTION

PATENT NO. : 4,939,533

DATED : July 3, 1990

INVENTOR(S) : Masaki Okada et al.

It is certified that error appears in the above-identified patent and that said Letters Patent is hereby corrected as shown below:

COLUMN 2:

Line 60, "units." should read --unit.--.

COLUMN 3:

Line 26, "th" should read --the--.

Line 49, "distacne-" should read --distance- --.

COLUMN 4:

Line 31, "insturction" should read --instruction--.

Line 56, "executeed" should read --executed--.

COLUMN 5:

Line 18, "eress $A_2$" should read --ress $A_2$--.

COLUMN 6:

Line 20, broadset" should read --broadest--.

UNITED STATES PATENT AND TRADEMARK OFFICE
CERTIFICATE OF CORRECTION

PATENT NO. : 4,939,533

DATED : July 3, 1990

INVENTOR(S) : Masaki Okada et al.

It is certified that error appears in the above-identified patent and that said Letters Patent is hereby corrected as shown below:

COLUMN 7:

Line 3, "said" should read --wherein said--.

Signed and Sealed this

Second Day of March, 1993

Attest:

STEPHEN G. KUNIN

*Attesting Officer*　　　Acting Commissioner of Patents and Trademarks